United States Patent
Wu et al.

(10) Patent No.: US 8,952,084 B1
(45) Date of Patent: Feb. 10, 2015

(54) SILICONE TREATED CARBON BLACK COMPOSITIONS

(71) Applicant: Xerox Corporation, Norwalk, CT (US)

(72) Inventors: Jin Wu, Pittsford, NY (US); Lin Ma, Pittsford, NY (US); Lanhui Zhang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/058,277

(22) Filed: Oct. 20, 2013

(51) Int. Cl.
*C08K 5/521* (2006.01)
*C08K 5/54* (2006.01)
*C08L 79/08* (2006.01)

(52) U.S. Cl.
CPC ............... *C08K 5/5406* (2013.01); *C08L 79/08* (2013.01)
USPC .......................................... 524/140; 399/308

(58) Field of Classification Search
CPC .............................. C08K 5/521; C08K 5/5406
USPC ........................................... 524/140; 399/308
See application file for complete search history.

(56) References Cited

U.S. PATENT DOCUMENTS 8,084,112 B2 * 12/2011 Wu et al. .................... 428/36.91

* cited by examiner

*Primary Examiner* — Peter Szekely
(74) *Attorney, Agent, or Firm* — Eugene O. Palazzo

(57) ABSTRACT

A composition that includes a polyalkylene glycol silicone phosphate and carbon black, and where there is formed between the carbon black and the silicone phosphate an ionic attachment and processes thereof.

28 Claims, 1 Drawing Sheet

SILICONE TREATED CARBON BLACK COMPOSITIONS

This disclosure is generally directed to compositions comprised of silicone phosphate treated carbon blacks, and more specifically, there is disclosed herein compositions comprised of carbon black with at least one ionically bonded polyalkylene glycol silicone phosphate and an optional polymer, and processes of preparation thereof.

BACKGROUND

Certain carbon black and carbon black containing mixtures are known. Also known are specific mixtures of carbon blacks generated with a polyethylene glycol with a weight average molecular weight of from about 1,000 to about 1,000,000. Disadvantages associated with the aforementioned carbon black mixtures relates to the difficulties in effectively and economically suitably dispersing the carbon black in polymer containing substances.

Further, a vast number of carbon blacks are known that have certain different characteristics, such as surface areas, sizes, surface substances, conductivities, and how the carbon blacks are prepared like, for example, in furnaces heated to high temperatures. These carbon blacks are usually not easily dispersible in polymers, and in some instances dispersions of these carbon blacks in polymers are not readily achievable.

The surface chemistry of carbon blacks is dependent, for example, on the production process that is selected. With the furnace black process, carbon black formation takes place in a highly reducing atmosphere, while with gas black processes, atmospheric oxygen has free access to the carbon black formation zone. Accordingly, the gas carbon blacks have a considerably higher content of surface oxides immediately after production than do furnace blacks.

Additionally known are the uses of specific carbon blacks in paints, toners, ink jet inks, rubbers, plastics, photoconductors, and intermediate transfer members. Thus, carbon black containing intermediate transfer members, such as intermediate transfer belts selected for transferring a developed image in xerographic systems, are known, see, for example, U.S. Pat. Nos. 8,545,989; 8,501,322; 8,465,839 and 8,361,624, all hereby totally incorporated by reference. Also, there are known a number of intermediate transfer members that include materials of a low unacceptable modulus or break strength, poor release characteristics from metal substrates, and which members are costly to prepare primarily because of the cost or scarcity of raw materials and the lengthy drying times. Further known are certain intermediate transfer members with characteristics that cause these members to become brittle resulting in inadequate acceptance of a toner developed image and subsequent partial transfer of the developed xerographic images to a substrate like paper.

A disadvantage relating to the preparation of an intermediate transfer member is that there is usually deposited on a metal substrate a separate release layer, and thereafter, there is applied to the release layer the intermediate transfer member components, and where the release layer allows the resultant intermediate transfer member to be separated from the metal substrate by peeling or by the use of mechanical devices. Thereafter, the intermediate transfer member is in the form of a film, which can be selected for xerographic imaging systems, or the film can be deposited on a supporting substrate such as a polymer layer. The use of a release layer adds to the cost and time of preparation, and such a layer can modify a number of the intermediate transfer member characteristics.

There is a need for treated carbon black compositions that substantially avoid or minimize the disadvantages of various known carbon blacks.

Further, there is a need for carbon blacks that can be fully, for example, from about 95 to about 100 percent, readily dispersed in polymers.

Yet further, there is a need for treated carbon black compositions and methods of preparation thereof, and which compositions can be selected for those situations where excellent polymeric dispersions thereof are desired, low surface energy carbon black containing mixtures are achievable, and where such carbon blacks can be selected for the preparation of intermediate transfer members, paints, xerographic photoconductors, ink jet inks, toners, lithography, IR absorption fluorosilicone plates, and the like.

There is also a need for intermediate transfer members that substantially avoid or minimize the disadvantages of a number of known intermediate transfer members.

Also, there is a need for intermediate transfer members with excellent break strengths as determined by their modulus measurements, which are readily releasable from substrates, and possess high glass transition temperatures, and improved stability with no or minimal degradation for extended time periods.

Moreover, there is a need for intermediate transfer member materials that possess rapid release characteristics from a number of substrates that are selected when such members are prepared.

Yet another need resides in providing intermediate transfer members that can be generated by flow coating processes, and that can be prepared by non-milling processes.

Another need relates to providing seamless intermediate transfer members that have excellent conductivity or resistivity, and that possess acceptable humidity insensitivity characteristics leading to developed images with minimal resolution issues.

There is also a need for dispersion processes that avoid the disadvantages of ball mills and ball milling processes for generating dispersions and coatings for substrates.

Further, there is a need for economical processes where treated carbon blacks are readily dispersible in polymers by the simple mechanical mixing thereof.

Another need resides in providing dispersion processes wherein contaminates are avoided or minimized, and which processes are environmentally acceptable.

Additionally, there is a need for processes that avoid or minimize the formation of undesirable grinding media residues.

Also, another need resides in providing processes where dispersions with desirable and consistent characteristics are obtained in a direct economical manner, and that minimize the formation of contaminates.

Moreover, a further need relates to economical environmental processes that produce dispersions with properties that enable the dispersions to be selected without further treatments for the formation of xerographic components, such as intermediate transfer members, fuser rolls, donor rolls, pressure rolls, toner transfer belts, and other roller surfaces, where roll milling and ball milling are avoided, and which processes result in components with excellent chemical, physical, and functional stability.

These and other needs are achievable in embodiments with the compositions and processes disclosed herein.

SUMMARY

Disclosed is a composition comprised of carbon black with at least one ionically bonded polyalkylene glycol silicone phosphate and optionally a polymer.

Further disclosed is a ball milling free and roll milling free process comprising the mechanical mixing in a solvent of a mixture of ingredients comprising a polymer, or a component that converts to a polymer and an ionically bonded polyalkylene glycol silicone phosphate treated carbon black.

Yet further disclosed is an intermediate transfer member that accepts a xerographic developed toner image from a photoconductor, and which member is comprised of a layer of an ionically bonded polyalkylene glycol silicone phosphate treated carbon black and a polymer.

FIGURES

The following Figures are provided to further illustrate the intermediate transfer members disclosed herein.

Although the Figures focus on intermediate transfer members, the disclosed processes may be used to produce fuser rolls, donor rolls, pressure rolls, toner transfer belts, paper conveying belts and other xerographic components illustrated herein.

EMBODIMENTS

The terms "including", "includes", "having", "has", "with", or variants thereof are intended to be inclusive in a manner similar to the term "comprising". The term "at least one of" means, for example, that one or more of the listed items can be selected.

Any disclosed numerical value inherently contains certain errors necessarily resulting from the standard deviation found in their respective testing measurements. Moreover, all ranges disclosed herein are to be understood to encompass any and all sub-ranges subsumed therein. For example, a range of from about 1 to about 10 can include any and all sub-ranges there between such as 2, 3, 4, 5, 6, 7, 8, 9, and 10, and about can include ranges below 1 and ranges above 10.

Figure 1:
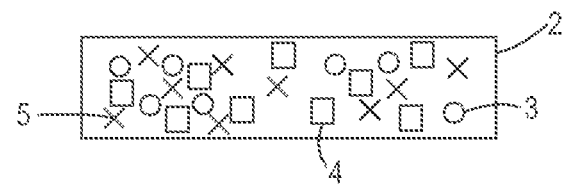
FIG. 1 illustrates an exemplary embodiment of a one-layer intermediate transfer member of the present disclosure.

In FIG. 1, there is illustrated an intermediate transfer member comprising a layer 2 comprised of the disclosed ionically bonded polyalkylene glycol silicone phosphate treated carbon blacks 3, dispersed in polymers 4, and optional siloxane polymers 5.

Figure 2:
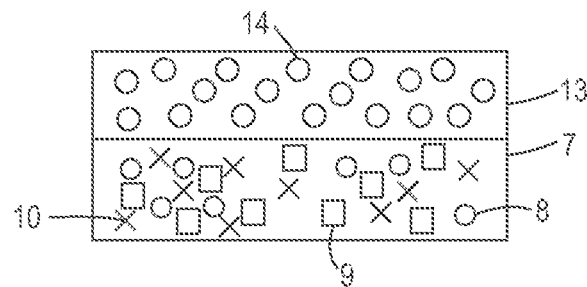
FIG. 2 illustrates an exemplary embodiment of a two-layer intermediate transfer member of the present disclosure.

In FIG. 2, there is illustrated a two-layer intermediate transfer member comprising a bottom layer 7 comprising the disclosed ionically bonded polyalkylene glycol silicone phosphate treated carbon blacks 8, dispersed in polymers 9, optional siloxane polymers 10, and an optional top or outer toner release layer 13 comprising release components 14.

Figure 3:
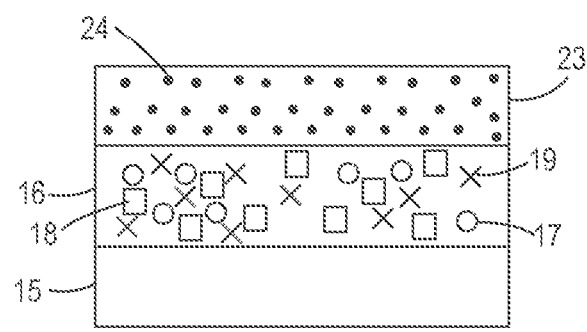
FIG. 3 illustrates an exemplary embodiment of a three-layer intermediate transfer member of the present disclosure.

In FIG. 3, there is illustrated a three-layer intermediate transfer member comprising a supporting substrate 15, a layer thereover 16 comprising the ionically bonded polyalkylene glycol silicone phosphate treated carbon blacks disclosed herein 17, polymers 18, optional siloxane polymers 19, and an optional release layer 23 comprising release components 24.

Compositions

The disclosed compositions are comprised of carbon blacks which have chemically attached, and surface grafted thereon, such as ionically attached to the surface thereof, polyalkylene glycol silicone phosphates, wherein alkylene contains, for example, from about 1 to about 25 carbon atoms, from about 1 to about 18 carbon atoms, from about 1 to about 10 atoms, from about 2 to about 12 carbon atoms, from about 2 to about 6 carbon atoms, or from about 2 to about 4 carbon atoms, such as methyl, ethyl, propyl, butyl, pentyl, heptyl, hexyl, octyl, nonyl, isomers thereof, and substituted derivatives thereof, and in embodiments where there can be a multiplicity of polyalkylenes present.

More specifically, examples of polyalkylene glycol silicone phosphates that are surface grafted, such as being ionically attached to carbon black surfaces, or where there is generated an ionic bond between the carbon black and the polyalkylene glycol silicone phosphates, are polyethylene glycol (PEG) silicone phosphates available as SilSense® PE-100 silicone, and obtainable from Lubrizol Corporation; polyethylene glycol-co-polypropylene glycol (PEG-co-PPG) silicone phosphates available as Silphos® A-100 and A-150, obtainable from Siltech Corporation, mixtures thereof, and the like. The acid values of the selected available polyalkylene glycol silicone phosphates are, for example, from about 10 mg KOH/g (milligrams per gram) to about 100 mg KOH/g, or from about 20 mg KOH/g to about 80 mg KOH/g. The available corresponding salts of the acidic polyalkylene glycol silicone phosphates can also be included for the compositions and processes of the present disclosure, such as the PEG-co-PPG silicone phosphates in a sodium salt form available as SILPHOS® J208 and D1008 from Siltech Corporation. Examples of polyethylene glycol silicone phosphates obtainable from Lubrizol Corporation and selected for the compositions and processes disclosed herein, and for the generation of at least one ionic bond between the polyethylene glycol silicone phosphates and carbon black, including the surface grafting thereof, such as by attaching and ionically bonding the polyethylene glycol silicone phosphates to the carbon black surface are illustrated with reference to the following formula/structure

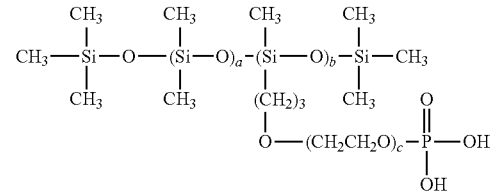

wherein a, b, and c are the number of the corresponding repeating units. More specifically, the value of a is, for example, from about 4 to about 200, from about 10 to about 175, from about 25 to about 150, from about 20 to about 100, or from about 6 to about 100; the value of b is, for example, from about 1 to about 30, from about 1 to about 20, from about 1 to about 12, or from about 2 to about 10; and the value of c is, for example, from about 1 to about 40, from about 1 to about 30, from about 1 to about 15, from about 2 to about 20, or from about 2 to about 10.

Examples of polyethylene glycol-co-polypropylene glycol (PEG-co-PPG) silicone phosphates available from Siltech Corporation, and selected for the compositions and processes disclosed herein and for the generation of at least one ionic bond between the polyethylene glycol silicone phosphates and carbon black, including the surface grafting thereof, such as by attaching and ionically bonding the polyethylene glycol silicone phosphates to the carbon black surface, are illustrated with reference to the following formulas/structures

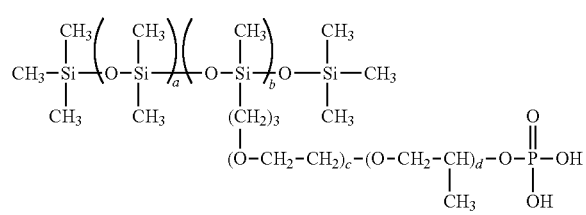

wherein a, b, c and d are the number of the corresponding repeating units. More specifically, the value of a is, for example, from about 4 to about 200, from about 10 to about 175, from about 25 to about 150, from about 20 to about 100, or from about 6 to about 100; the value of b is, for example from about 1 to about 30, from about 1 to about 20, from about 1 to about 12, or from about 2 to about 10; the value of c is, for example, from about 1 to about 40, from about 1 to about 30, from about 1 to about 15, from about 2 to about 20, or from about 2 to about 10, and the value of d is, for example, from about 1 to about 40, from about 1 to about 30, from about 1 to about 15, from about 2 to about 20, or from about 2 to about 10.

The disclosed compositions can include various amounts of the polyalkylene glycol silicone phosphates and carbon black, thus for example, from about 40 to about 99 or from about 70 to about 95 weight percent of the carbon blacks are present and from about 1 to about 60 or from about 5 to about 30 weight percent of the polyalkylene glycol silicone phosphates are present based on the solids, and where the total thereof is about 100 percent.

Processes

In accordance with the compositions and processes of the present disclosure, ionically bonded or ionic bond means, for example, a type of chemical bond formed through an electrostatic attraction between two oppositely charged ions. Ionic bonds are formed primarily because of the attraction between an atom that has lost one or more electrons (cation) and an atom that has gained one or more electrons (anion). Also, usually ionic compounds have some degree of covalent bonding, or electron sharing, thus the phrase ionically bonded or ionic bond refers to a bond in which the ionic character is greater than the covalent character, that is where for example, a bond in which a large electronegativity difference exists between the two atoms, causing the bond to be more polar (ionic) than other forms of covalent bonding where electrons are shared more equally. Bonds with partially ionic and partially covalent character have been referred to as polar covalent bonds. Nevertheless, ionic bonding in accordance with the present disclosure is considered to be, for example, a form of non-covalent bonding, and where, for example, for an ionic bond of the present disclosure the respective atoms are bound by attraction of opposite ions, as compared to a covalent bond where atoms are bound by sharing electrons to attain stable electron configurations.

Carbon blacks can be treated in accordance with the present disclosure by ionically bonding thereto a polyalkylene glycol silicone phosphate, or where there is formed an ionic bond between the carbon black and the polyalkylene glycol phosphate. More specifically, the process of the present disclosure comprises the mixing of carbon blacks and polyalkylene glycol silicone phosphates, followed by centrifuging to obtain a carbon black/polyalkylene glycol silicone phosphate wet cake, dispersing the obtained wet cake in a suitable solvent, where when the carbon black is mixed with the silicone phosphate in the solvent, an ionic bond forms therebetween, followed by centrifuging and then vacuum drying of the composition obtained by heating, resulting in at least one ionic bond formed between the carbon black and the polyalkylene glycol silicone phosphate inclusive of where the polyalkylene glycol silicone phosphate is ionically and chemically attached to the carbon black. The presence of at least one ionic bond, such as between the carbon black and the silicone segments, or where a silicone segment is ionically attached to the carbon black can each be confirmed by X-ray photospectroscopy (XPS) analysis.

More specifically, the disclosed processes comprise the mixing of carbon black with a polyalkylene glycol silicone phosphate in, for example, a weight ratio of about 99/1, of about 75/25, or about 60/40 in a suitable solvent such as toluene, hexane, cyclohexane, heptane, tetrahydrofuran, methyl ethyl ketone, methyl isobutyl ketone, N,N'-dimethylformamide, N,N'-dimethylacetamide, N-methyl pyrrolidone (NMP), methylene chloride, and mixtures thereof, and where the solvent is selected in, for example, an amount of from about 40 weight percent to about 95 weight percent, from about 75 to about 175 rpm, or from about 50 weight percent to about 75 weight percent based on the amounts of total solids present, and which mixtures are generated using mechanical mixing, high shear mixing, or milling for a suitable period of time, such as from about 20 to about 600 minutes, from about 50 to about 400 minutes, from about 75 to about 325 minutes, from about 120 minutes to about 480 minutes, or from about 100 to about 175 minutes. The resulting mixture can then be centrifuged at a speed of, for example, from about 1,000 rpm (revolutions per minute) to about 10,000 rpm, from about 2,000 rpm to about 8,000 rpm, or from about 4,000 to about 7,000 rpm to obtain a wet cake of the carbon black and the polyalkylene glycol silicone phosphate.

Thereafter, the resulting wet cake can be re-dispersed in the disclosed solvent with the total solids being, for example, from about 40 weight percent to about 95 weight percent, from about 50 weight percent to about 75 weight percent, from about 1 to about 20 weight percent, from about 1 to about 10 weight percent, or from 5 to about 10 weight percent, using mechanical stirring or high shear mixing for a period of time of, for example, from about 5 to about 120 minutes, or from about 40 to about 60 minutes. The mixture obtained can then be centrifuged at a speed of, for example, from about 1,000 to about 10,000 rpm, or from about 3,000 to about 7,000 rpm, for a suitable period of time, such as, for example, from about 20 to about 600 minutes, from about 50 to about 400 minutes, from about 75 to about 325 minutes, from about 360 minutes to about 1,200 minutes, or from about 100 to about 175 minutes to obtain a second wet cake of the carbon black and the silicone phosphate. This process can be repeated at least twice to completely remove the residual silicone phosphate that is not ionically bonded to the carbon black surface, then the obtained wet cake can be vacuum dried at, for example, a temperature of from about 50° C. to about 90° C., or from about 65° C. to about 80° C. for a period of, for example, from about 4 to about 24 hours, or from about 7 to about 15 hours to completely remove any residual solvent.

Dispersions of the present disclosure can be prepared by simple mechanical mixing processes, and in the absence of ball milling and roll milling. In an embodiment of the present disclosure, the mechanical mixing process comprises providing or preparing a composition of a polymer, or a component that converts to a polymer, together with the disclosed treated ionically bonded carbon black and a solvent, and subjecting the resulting mixture to mechanical agitation to form a dispersion, followed by filtration. More specifically, this aspect of the process of the present disclosure comprises the mechanical mixing of an ionically bonded polyalkylene glycol silicone phosphate treated carbon black and a solvent to form a slurry, adding a polymer as illustrated herein, or a component that converts to a polymer to the slurry, subjecting the slurry formed to mechanical mixing, and then optionally filtering the resulting dispersion.

The disclosed mechanical mixing can be accomplished at suitable temperatures, such as room temperature of from about 22° C. to about 25° C., with known mixing devices, commercially available, and where, for example, there is selected a magnetic stirrer, a vibrating stirrer, hand stirring with an elongated rod, such as a glass rod, shaking the mixture, repeatedly transferring the mixture from one container or flask to another container or flask, automatic controlled stirring using at least one paddle, hand stirring using at least one paddle, combinations thereof, and the like. In an embodiment of the present disclosure, there can be selected for the formation of dispersions mechanical mixing of the compositions with an IKA RW20 Digital Mechanical Stirrer available from Fisher Scientific.

Mechanical stirring speeds can vary depending, for example, on the components being mixed and the devices selected. Generally, stirring speeds and stirring times are selected that will permit the initial formation of slurries, and then the generation of dispersions from the formed slurry. Examples of stirring speeds are from about 40 to about 500 revolutions per minute (rpm), from about 50 to about 250 revolutions per minute (RPM), from about 50 to about 200 revolutions per minute, from about 75 to about 175 revolutions per minute, from about 100 to about 150 revolutions per minute, from about 105 to about 135 revolutions per minute, or from about 115 to about 125 revolutions per minute.

The stirring times are dependent on a number of factors, such as the components and amounts thereof present, the stirring mechanism selected, the process sequence, that is the formation of a slurry, and the formation of the dispersion, and the specific stirring devices used. However, generally the stirring times are from about 1 to about 25 hours, from about 5 to about 20 hours, from about 6 to about 20 hours, from about 2 to about 8 hours, from about 3 to about 7 hours, about 5 minutes to about 120 minute, or from about 40 to about 60 minutes. For the generation of a slurry, the more specific stirring times can be from about 2 to about 8 hours, or from 4 to about 7 hours. From about 4 to about 25 hours, or from about 6 to about 20 hours of stirring time can be selected for converting the slurry into a dispersion. The resulting dispersion can then be filtered with various known filters, such as paper and cloth filters, with suitable pore sizes of, for example, from about 15 to about 150 microns, from about 20 to about 100 microns, or from about 35 to about 75 microns.

Subsequent to the preparation of the disclosed dispersions, they can be selected for the generation of xerographic components, such as intermediate transfer members, fuser rolls, donor rolls, pressure rolls, toner transfer belts, paper conveying belts, and other components, and where, for example, the dispersions can be applied to a metal substrate, followed by the self release thereof. The product obtained can then be selected for the xerographic components disclosed herein, or the product obtained can be coated on a supporting substrate. For example, intermediate transfer members can be prepared in accordance with the following disclosures, it being noted that other xerographic components and paper conveyor belts can be prepared in a similar manner.

The disclosed dispersions of the treated carbon black and a polymer, like a polyamide, can be selected as a liquid coating dispersion mixture that can be flow coated on a metal substrate like a stainless steel substrate, aluminum, nickel, copper, and alloys thereof, and glass plates, and subsequently, optionally cured by heating at, for example, from about 50° C. to about 95° C., or from about 50° C. about 75° C. for from about 20 to about 50 minutes, or from about 25 to about 35 minutes, followed by heating at from about 175° C. to about 210° C., or from about 180° C. to about 195° C. for from about 20 to about 45 minutes, or from about 25 to about 35 minutes, and then further heating at from about 290° C. to about 340° C., or from about 300° C. to about 325° C. for from about 40 to about 80 minutes, or for from about 50 to about 65 minutes. The resulting film after drying and cooling to room temperature, about 22 to about 25° C., is readily releasable without the assistance of any external processes from the metal substrate. That is, the members obtained immediately release, or self-release, such as for example, within from about 1 to about 15 seconds, from about 1 to about 10 seconds, from about 5 to about 15 seconds, from about 5 to about 10 seconds, or about 1 second without any external assistance, from the metal substrate, such as a stainless steel substrate. Also, the efficiently and economically formed mixture film will fully separate, such as for example, a separation of from about 90 to about 100 percent, or from about 95 to about 99 percent from metal substrates, and where release materials and separate release layers can be avoided.

The self-released disclosed coating dispersion mixtures can be selected as the illustrated herein xerographic components, such as an intermediate transfer member, or the film resulting can be coated on the optional supporting substrates illustrated herein, by liquid spray coating, dip coating, wire wound rod coating, fluidized bed coating, powder coating, electrostatic spraying, sonic spraying, blade coating, molding, laminating, and the like. The optional supporting substrate can be formed in various shapes, such as a belt, or a film using suitable materials that are non-conductive or conductive with the thickness of the coating, such as those for intermediate transfer members being, for example, from about 30 to about 1,000 microns, from about 100 to about 800 microns, from about 150 to about 500 microns, from about 100 to about 125 microns, or from about 75 to about 80 microns. In embodiments, the intermediate transfer film coating mixture subsequent to optional curing can have a thickness of, for example, from about 30 to about 400 microns, from about 15 to about 150 microns, from about 20 to about 100 microns, from about 50 to about 200 microns, from about 70 to about 150 microns, or from about 25 to about 75 microns.

With the disclosed processes in embodiments thereof the phosphate group of the silicone phosphate forms at least one ionic bond with the organic groups on the carbon black surface where the organic groups include, for example, phenolic groups, carboxylic acid groups, mixtures thereof, and the like. Depending, for example, on the carbon black, the type of groups present on the carbon black surface, and the number of groups, there can be formed a plurality of ionic bonds between the carbon black and the polyalkylene glycol silicone phosphate as determined by X-ray photospectroscopy analysis. For example, at least one ionic bond is formed between the carbon black and the polyalkylene glycol silicone phosphate, including a multiplicity of bonds, such as for example from 1 to about 75, from 1 to about 50, from 1 to about 20, from about 2 to about 50, and the like.

Carbon Blacks

Numerous known carbon blacks can be selected for the compositions and processes disclosed herein. Representative examples of carbon blacks include various carbon blacks, such as channel blacks, furnace blacks and lamp blacks, and more specifically, carbon blacks available as Regal® carbon blacks, Black Pearls®, such as Black Pearls® 2000, Black Pearls® 1400, Black Pearls®1300, Black Pearls®1100, Black Pearls® 1000, Black Pearls®900, Black Pearls®880, Black Pearls®800, Black Pearls®700, Vulcan®Special Black 4, Special Black 5, FW200, Raven® 780, Raven® 890, Raven® 1020, Raven® 1040, Raven® 1255, Raven® 1500, Raven® 5000, Raven 5250®, mixtures thereof, and the like.

Specific examples of carbon blacks selected for the compositions and processes of the present disclosure include special black 4 (B.E.T. surface area=180 m²/g, DBP absorption=1.8 ml/g, primary particle diameter=25 nanometers) available from Evonik-Degussa, special black 5 (B.E.T. surface area=240 m²/g, DBP absorption=1.41 ml/g, primary particle diameter=20 nanometers), color black FW1 (B.E.T. surface area=320 m²/g, DBP absorption=2.89 ml/g, primary particle diameter=13 nanometers), color black FW2 (B.E.T. surface area=460 m²/g, DBP absorption=4.82 ml/g, primary particle diameter=13 nanometers), color black FW200 (B.E.T. surface area=460 m²/g, DBP absorption=4.6 ml/g, primary particle diameter=13 nanometers), all available from Evonik-Degussa; VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1000 (B.E.T. surface area=343 m²/g, DBP absorption=1.05 ml/g), 880 (B.E.T. surface area=240 m²/g, DBP absorption=1.06 ml/g), 800 (B.E.T. surface area=230 m²/g, DBP absorption=0.68 ml/g), L (B.E.T. surface area=138 m²/g, DBP absorption=0.61 ml/g), 570 (B.E.T. surface area=110 m²/g, DBP absorption=1.14 ml/g), 170 (B.E.T. surface area=35 m²/g, DBP absorption=1.22 ml/g), VULCAN® XC72 (B.E.T. surface area=254 m²/g, DBP absorption=1.76 ml/g), XC72R (fluffy form of VULCAN® XC72), XC605, XC305, REGAL® 660 (B.E.T. surface area=112 m²/g, DBP absorption=0.59 ml/g), 400 (B.E.T. surface area=96 m²/g, DBP absorption=0.69 ml/g), 330 (B.E.T. surface area=94 m²/g, DBP absorption=0.71 ml/g), MONARCH® 880 (B.E.T. surface area=220 m²/g, DBP absorption=1.05 ml/g, primary particle diameter=16 nanometers), and 1000 (B.E.T. surface area=343 m²/g, DBP absorption=1.05 ml/g, primary particle diameter=16 nanometers); channel special carbon black 4 and channel special carbon black 5 available from Orion, and Channel carbon blacks available from Evonik-Degussa.

Optional Polymers and Dispersions Thereof

The treated ionically bonded carbon black compositions illustrated herein can be effectively dispersed, such as in an amount of from about 90 to about 100 percent, or from about 95 to about 100 percent, in a number of known polymers by, for example, solid extrusion methods or the mixing thereof in solvents.

Polymer examples present in, for example, the weight percent ratios illustrated herein, and in an amount of from about 60 to about 99 weight percent, or from about 75 to about 90 weight percent based on the solids, include polyimides such as those represented by at least one of the following formulas/structures, and mixtures thereof

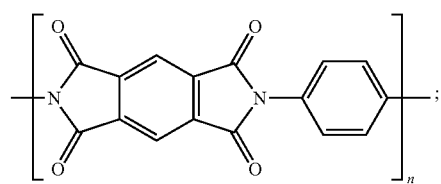

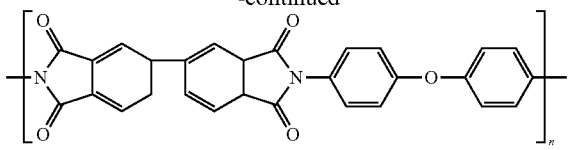

and

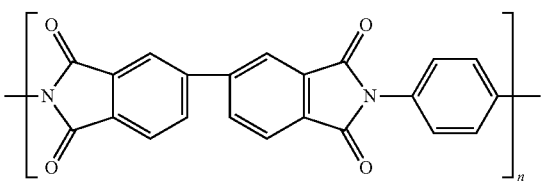

where n represents the number of repeating segments of, for example, from about 5 to about 3,000, from about 50 to about 2,000, from about 50 to about 1,500, from about 200 to about 1,200, from about 1,000 to about 2,000, from about 1,200 to about 1,800, or from about 20 to about 200.

Examples of polyimides selected for the processes and compositions illustrated herein can be formed from, or converted in a slurry from a polyimide precursor of a polyamic acid that includes one of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and the like, and mixtures thereof. After curing by heating the resulting polyimides, include a polyimide of pyromellitic dianhydride/4,4'-oxydianiline, a polyimide of pyromellitic dianhydride/phenylenediamine, a polyimide of biphenyl tetracarboxylic dianhydride/4,4'-oxydianiline, a polyimide of biphenyl tetracarboxylic dianhydride/phenylenediamine, a polyimide of benzophenone tetracarboxylic dianhydride/4,4'-oxydianiline, a polyimide of benzophenone tetracarboxylic dianhydride/4,4'-oxydianiline/phenylenediamine, and mixtures thereof.

Commercially available examples of polyamic acids of pyromellitic dianhydride/4,4'-oxydianiline selected include PYRE-ML® RC-5019 (about 15 to 16 weight percent in N-ethyl-2-pyrrolidone, NMP), RC-5057 (about 14.5 to 15.5 weight percent in NMP/aromatic hydrocarbon=80/20), and RC-5083 (about 18 to 19 weight percent in NMP/DMAc=15/85), all from Industrial Summit technology Corp., and Parlin, N.J.; DURIMIDE® 100, commercially available from FUJIFILM Electronic Materials U.S.A., Inc.

Polyamic acids of biphenyl tetracarboxylic anhydride/phenylenediamine examples include U-VARNISH® A, and S (about 20 weight percent in NMP), both available from UBE America Inc., New York, N.Y., BPDA resin (about 16.8 weight percent in NMP), available from Kaneka Corporation, and TX, PI-2610 (about 10.5 weight percent in NMP), and PI-2611 (about 13.5 weight percent in NMP), both available from HD MicroSystems, Parlin, N.J.

Examples of polyamic acids of benzophenone tetracarboxylic dianhydride/4,4'-oxydianiline include RP46 and RP50 (about 18 weight percent in NMP), both available from Unitech Corp., Hampton, Va.

Polyamic acids of benzophenone tetracarboxylic dianhydride/4,4'-oxydianiline/phenylenediamine examples are PI-2525 (about 25 weight percent in NMP), PI-2574 (about 25 weight percent in NMP), PI-2555 (about 19 weight percent in NMP/aromatic hydrocarbon=80/20), and PI-2556 (about 15 weight percent in NMP/aromatic hydrocarbon/propylene glycol methyl ether=70/15/15), all available from HD MicroSystems, Parlin, N.J.

More specifically, polyamic acid or esters of polyamic acid examples that can be selected for the formation of a polyimide are prepared by the reaction of a dianhydride and a diamine. Suitable dianhydrides selected include aromatic dianhydrides and aromatic tetracarboxylic acid dianhydrides such as, for example, 9,9-bis(trifluoromethyl)xanthene-2,3,6,7-tetracarboxylic acid dianhydride, 2,2-bis(3,4-dicarboxyphenyl)hexafluoropropane dianhydride, 2,2-bis((3,4-dicarboxyphenoxy)phenyl)hexafluoropropane dianhydride, 4,4'-bis (3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)ether dianhydride, di-(4-(3,4-dicarboxyphenoxy)phenyl) sulfide dianhydride, di-(3,4-dicarboxyphenyl)methane dianhydride, di-(3,4-dicarboxyphenyl) ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5, 6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3', 4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1, 1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis (2,3-dicarboxyphenyl)methane dianhydride, bis(3,4-dicarboxyphenyl)methane dianhydride, 4,4'-(p-phenylenedioxy) diphthalic dianhydride, 4,4'-(m-phenylenedioxy)diphthalic dianhydride, 4,4'-diphenylsulfidedioxybis(4-phthalic acid) dianhydride, 4,4'-diphenylsulfonedioxybis(4-phthalic acid) dianhydride, methylenebis(4-phenyleneoxy-4-phthalic acid) dianhydride, ethylidenebis(4-phenyleneoxy-4-phthalic acid) dianhydride, isopropylidenebis(4-phenyleneoxy-4-phthalic acid)dianhydride, hexafluoroisopropylidenebis(4-phenyleneoxy-4-phthalic acid)dianhydride, and the like.

Exemplary diamines suitable for use in the preparation of the polyamic acids include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluorobiphenyl, 4,4'-diamino-2,2',3,3',5,5',6,6'-octafluorodiphenyl ether, bis[4-(3-aminophenoxy)-phenyl]sulfide, bis[4-(3-aminophenoxy)phenyl]sulfone, bis[4-(3-aminophenoxy)phenyl] ketone, 4,4'-bis(3-aminophenoxy)biphenyl, 2,2-bis[4-(3-aminophenoxy)phenyl]-propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, and 2,2-di(p-aminophenyl)-1,1,1,3,3,3-hexafluoropropane, and the like, and mixtures thereof.

The dianhydrides and diamines are, for example, selected in a weight ratio of from about 20:80 to about 80:20, a weight ratio of from about 60/40 to about 40/60, and about a 50:50 weight ratio.

Additional polymer examples that can be selected for the compositions or composites of the present disclosure are polycarbonates, polyesters, polysulfones, polyphenylsulfones, polyethersulfones, polyamides, polyamideimides, polyetherimides, polyolefins, polystyrenes, polyvinyl halides, polyvinylidene halides, polyphenyl sulfides, polyphenyl oxides, polyaryl ethers, polyether ether ketones, mixtures thereof, and the like.

More specifically, examples of polyesters that can be selected for the disclosed dispersions include aliphatic polyesters, such as polyglycolic acids, polylactic acids, and polycaprolactones; aliphatic copolyesters such as polyethylene adipates and polyhydroxyalkanoates; and aromatic copolyesters such as polyethylene terephthalates (PET), polybutylene terephthalates (PBT), polytrimethylene terephthalates (PTT), and polyethylene naphthalates (PEN). Specific aromatic copolyesters include VITEL® 1200B ($T_g$=69° C., $M_w$=45, 000, a copolyester prepared from ethylene glycol, diethylene glycol, terephthalic acid, and isophthalic acid), 3300B ($T_g$=18° C., $M_w$=63,000), 3350B ($T_g$=18° C., $M_w$=63,000), 3200B ($T_g$=17° C., $M_w$=63,500), 3550B ($T_g$=−11° C., $M_w$=75,000), 3650B ($T_g$=−10° C., $M_w$=73,000), 2200B ($T_g$=69° C., $M_w$=42,000), a copolyester prepared from ethylene glycol, diethylene glycol, neopentyl glycol, terephthalic acid, and isophthalic acid), 2300B ($T_g$=69° C., $M_w$=45,000), all available from Bostik Chemicals, and where $T_g$ refers to the glass transition temperature and $M_w$ refers to the weight average molecular weight believed to be determined by GPC analysis.

Polycarbonate polymer examples that can be selected for the disclosed dispersions include poly(4,4'-isopropylidenediphenylene) carbonate (also referred to as bisphenol-A-polycarbonate), poly(4,4'-cyclohexylidine diphenylene) carbonate (also referred to as bisphenol-Z-polycarbonate), poly (4,4'-isopropylidene-3,3'-dimethyl-diphenyl) carbonate (also referred to as bisphenol-C-polycarbonate), and the like. In embodiments, the polycarbonate polymers are comprised of bisphenol-A-polycarbonate resins, commercially available as MAKROLON® or FPC® with, for example, a weight average molecular weight, believed to be determined by GPC analysis, of from about 50,000 to about 500,000, or from about 225,000 to about 425,000.

Polysulfone examples, all available or obtainable from Solvay Advanced Polymers, LLC, Alpharetta, Ga., selected for the disclosed dispersions include polyphenylsulfones such as RADEL® R-5000NT, and 5900NT; polysulfones such as UDEL® P-1700, P-3500, or polyethersulfones such as RADEL® A-200A, AG-210NT, AG-320NT, VERADEL® 3000P, 3100P, 3200P. Polyphenylene sulfide polymers that can be selected for the disclosed dispersions include RYTON®polyphenylene sulfide, available from Chevron Phillips as a crosslinked polymer, FORTRON® polyphenylene sulfide available from Ticona Incorporated as a linear polymer; and SULFAR® polyphenylene sulfide available from Testori Incorporated.

Polyamide polymers that can be selected for the disclosed dispersions include aliphatic polyamides, such as Nylon 6 and Nylon 66 available from E. I. DuPont; semi aromatic polyamides, or polyphthalamides such as TROGAMID® 6T available from Evonik Industries, or aromatic polyamides, aramides such as KEVLAR® and NOMEX® available from E.I. DuPont, or TEIJINCONEX®, TWARON® or TECHNORA® available from Teijin Incorporated.

Examples of polyether ether ketone polymers that can be selected for the disclosed mixtures include VICTREX® PEEK 90G, 150G, 450G, 150FC30, 450FC30, 150FW30, 450FE20, WG101, WG102, ESD101, all available from VICTREX Manufacturing Limited.

Polyamideimide examples that can be selected for the disclosed mixtures include TORLON® Al-10 ($T_g$=272° C.), commercially available from Solvay Advanced Polymers, LLC, Alpharetta, Ga.

Examples of polyetherimide polymers that can be selected for the disclosed mixtures include ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Examples of thermoplastic polyimide polymers that can be selected for the disclosed mixtures include P84® polyimide available from HP Polymer Inc., Lewisville, Tex.

Solvents

Examples of solvents selected for the compositions and processes illustrated herein are toluene, hexane, cyclohexane, heptane, tetrahydrofuran, methyl ethyl ketone, methyl isobutyl ketone, N,N'-dimethylformamide, N,N'-dimethylacetamide, N-methylpyrrolidone (NMP), methylene chloride, and mixtures thereof, and where the solvent is selected in, for example, an amount of from about 40 weight percent to about 95 weight percent, or from about 50 weight percent to about 75 weight percent based on the amount of total solids present.

Intermediate Transfer Members

The disclosed intermediate transfer members can be comprised of a polymer, such as those illustrated herein, and the ionically bonded polyalkylene glycol silicone phosphate treated carbon blacks illustrated herein, which compositions self-release from a metal substrate, such as stainless steel, and where an external release layer on the metal substrate can be avoided. Thus, the disclosed coating mixture is cost effective since, for example, only one component is needed for the polyimide containing intermediate transfer member mixture.

Examples of polyimide polymers selected for the intermediate transfer member mixtures illustrated herein can be formed from a polyimide precursor of a polyamic acid that includes one of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and the like, and mixtures thereof. After curing by heating the resulting polyimides include a polyimide of pyromellitic dianhydride/4,4'-oxydianiline, a polyimide of pyromellitic dianhydride/phenylenediamine, a polyimide of biphenyl tetracarboxylic dianhydride/4,4'-oxydianiline, a polyimide of biphenyl tetracarboxylic dianhydride/phenylenediamine, a polyimide of benzophenone tetracarboxylic dianhydride/4, 4'-oxydianiline, a polyimide of benzophenone tetracarboxylic dianhydride/4,4'-oxydianiline/phenylenediamine, and mixtures thereof.

Commercially available examples of polyamic acids of pyromellitic dianhydride/4,4'-oxydianiline selected include PYRE-ML® RC-5019 (about 15 to 16 weight percent in N-ethyl-2-pyrrolidone, NMP), RC-5057 (about 14.5 to 15.5 weight percent in NMP/aromatic hydrocarbon=80/20), and RC-5083 (about 18 to 19 weight percent in NMP/DMAc=15/85), all from Industrial Summit technology Corp., and Parlin, N.J.; DURIMIDE® 100, commercially available from FUJIFILM Electronic Materials U.S.A., Inc.

Polyamic acids of biphenyl tetracarboxylic anhydride/phenylenediamine examples include U-VARNISH® A, and S (about 20 weight percent in NMP), both available from UBE America Inc., New York, N.Y., BPDA resin (about 16.8 weight percent in NMP), available from Kaneka Corporation, and TX, PI-2610 (about 10.5 weight percent in NMP), and PI-2611 (about 13.5 weight percent in NMP), both available from HD MicroSystems, Parlin, N.J.

Examples of polyamic acids of benzophenone tetracarboxylic dianhydride/4,4'-oxydianiline include RP46 and RP50 (about 18 weight percent in NMP), both available from Unitech Corp., Hampton, Va.

Polyamic acids of benzophenone tetracarboxylic dianhydride/4,4'-oxydianiline/phenylenediamine examples are PI-2525 (about 25 weight percent in NMP), PI-2574 (about 25 weight percent in NMP), PI-2555 (about 19 weight percent in NMP/aromatic hydrocarbon=80/20), and PI-2556 (about 15 weight percent in NMP/aromatic hydrocarbon/propylene glycol methyl ether=70/15/15), all available from HD MicroSystems, Parlin, N.J.

More specifically, polyamic acid or esters of polyamic acid examples that can be selected for the formation of a polyimide are prepared by the reaction of a dianhydride and a diamine. Suitable dianhydrides selected include aromatic dianhydrides and aromatic tetracarboxylic acid dianhydrides such as, for example, 9,9-bis(trifluoromethyl)xanthene-2,3,6,7-tetracarboxylic acid dianhydride, 2,2-bis(3,4-dicarboxyphenyl)hexafluoropropane dianhydride, 2,2-bis((3,4-dicarboxyphenoxy)phenyl)hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)ether dianhydride, di-(4-(3,4-dicarboxyphenoxy)phenyl) sulfide dianhydride, di-(3,4-dicarboxyphenyl)methane dianhydride, di-(3,4-dicarboxyphenyl) ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5, 6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3', 4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3- dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride, 4,4'-(m-phenylenedioxy)diphthalic dianhydride, 4,4'-diphenylsulfidedioxybis(4-phthalic acid)dianhydride, 4,4'-diphenylsulfonedioxybis(4-phthalic acid)dianhydride, methylenebis(4-phenyleneoxy-4-phthalic acid)dianhydride, ethylidenebis(4-phenyleneoxy-4-phthalic acid)dianhydride, isopropylidenebis(4-phenyleneoxy-4-phthalic acid)dianhydride, hexafluoroisopropylidenebis(4-phenyleneoxy-4-phthalic acid)dianhydride, and the like.

Exemplary diamines suitable for use in the preparation of the polyamic acids include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluorobiphenyl, 4,4'-diamino-2,2',3,3',5,5',6,6'-octafluorodiphenyl ether, bis[4-(3-aminophenoxy)-phenyl]sulfide, bis[4-(3-aminophenoxy)phenyl]sulfone, bis[4-(3-aminophenoxy)phenyl]ketone, 4,4'-bis(3-aminophenoxy)biphenyl,2,2-bis[4-(3-aminophenoxy)phenyl]-propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl) propane, and 2,2-di(p-aminophenyl)-1,1,1,3,3,3-hexafluoropropane, and the like, and mixtures thereof.

The dianhydrides and diamines are, for example, selected in a weight ratio of from about 20:80 to about 80:20, a weight ratio of from about 60/40 to about 40/60, or about a 50:50 weight ratio.

Polyimide examples selected for the disclosed intermediate transfer member layer mixtures are represented by at least one of the following formulas/structures, and mixtures thereof

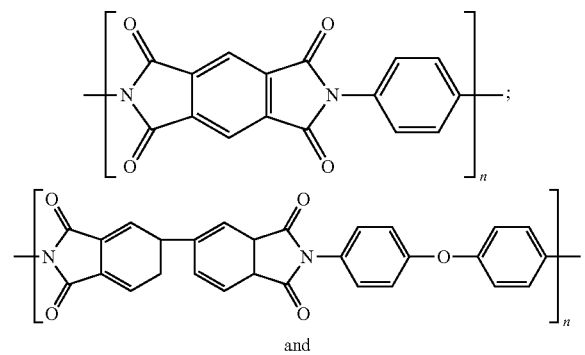

and

-continued

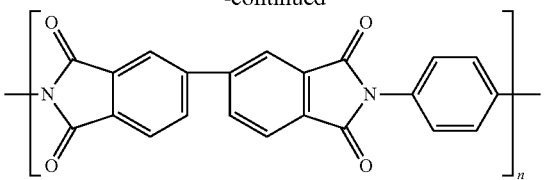

where n represents the number of repeating segments of, for example, from about 5 to about 3,000, from about 50 to about 2,000, from about 50 to about 1,500, from about 200 to about 1,200, from about 1,000 to about 2,000, from about 1,200 to about 1,800, or from about 20 to about 200.

The disclosed polyimide and the treated carbon black ionically bonded to a polyethylene glycol silicone phosphate containing mixture possess, for example, a Young's modulus of from about 4,000 to about 10,000 Mega Pascals (MPa), from about 5,000 to about 10,000 MPa, from about 6,500 to about 7,500 MPa, from about 6,000 to about 10,000 MPa, from about 7,800 to about 7,900 MPa, or from about 7,500 to about 8,000 MPa, a break strength of, for example, from about 190 to about 230 MPa, or from about 195 to about 200 MPa, and an onset decomposition temperature as determined by Differential Scanning Calorimetry (DSC), of greater than about 150° C. inclusive of from about 400° C. to about 650° C., from about 500° C. to about 640° C., from about 600° C. to about 630° C., from about 160° C. to about 400° C., or from about 170° C. to about 350° C., and more specifically, a Young's modulus of about 7,500 MPa and a break strength of about 200 MPa, or a Young's modulus of about 9,900 MPa and a break strength of about 230 MPa.

Optional Polysiloxane Polymers

The intermediate transfer member disclosed mixtures can also generally comprise a polysiloxane polymer. Examples of polysiloxane polymers selected for the intermediate transfer member mixtures disclosed herein include known suitable polysiloxanes, such as a copolymer of a polyether and a polydimethylsiloxane, commercially available from BYK Chemical as BYK® 333, 330 (about 51 weight percent in methoxypropylacetate), and 344 (about 52.3 weight percent in xylene/isobutanol, ratio of 80/20); BYK®-SILCLEAN 3710 and 3720 (about 25 weight percent in methoxypropanol); a copolymer of a polyester and a polydimethylsiloxane, commercially available from BYK Chemical as BYK® 310 (about 25 weight percent in xylene), and 370 (about 25 weight percent in xylene/alkylbenzenes/cyclohexanone/monophenylglycol, ratio of 75/11/7/7); a copolymer of a polyacrylate and a polydimethylsiloxane, commercially available from BYK Chemical as BYK®-SILCLEAN 3700 (about 25 weight percent in methoxypropylacetate); a copolymer of polyester polyether and a polydimethylsiloxane, commercially available from BYK Chemical as BYK® 375 (about 25 weight percent in di-propylene glycol monomethyl ether); and mixtures thereof.

The polysiloxane polymer, or copolymers thereof can be included in the disclosed coating compositions and intermediate transfer members thereof in an amount of, for example, from about 0.1 to about 10 weight percent, from about 0.01 to about 1 weight percent, from about 0.05 to about 1 weight percent, from about 0.05 to about 0.5 weight percent, from about 0.1 to about 0.5 weight percent, from about 0.2 to about 0.5 weight percent, or from about 0.1 to about 0.3 weight percent based on the total weight of the solid components or ingredients present.

Optional Supporting Substrates

If desired, a supporting substrate can be included in the disclosed intermediate transfer members, such as beneath the disclosed treated carbon black containing mixture layer. The supporting substrate can be included to provide increased rigidity or strength to the intermediate transfer member or to other members.

Exemplary supporting substrate materials include polyimides, polyamideimides, polyetherimides, mixtures thereof, and the like.

More specifically, examples of the intermediate transfer member supporting substrates are polyimides inclusive of known low temperature, and rapidly cured polyimide polymers, such as VTEC™ PI 1388, 080-051, 851, 302, 203, 201, and PETI-5, all available from Richard Blaine International, Incorporated, Reading, Pa., polyamideimides, polyetherimides, and the like. The thermosetting polyimides can be cured at temperatures of from about 180° C. to about 260° C. over a short period of time, such as from about 10 to about 120 minutes, or from about 20 to about 60 minutes, and generally have a number average molecular weight of from about 5,000 to about 500,000 or from about 10,000 to about 100,000, and a weight average molecular weight of from about 50,000 to about 5,000,000, or from about 100,000 to about 1,000,000. Also, for the supporting substrate there can be selected thermosetting polyimides that can be cured at temperatures of above 300° C., such as PYRE M.L.® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; and KAPTON® HN, VN and FN, all commercially available from E.I. DuPont, Wilmington, Del.

Examples of polyamideimides that can be selected as supporting substrates for the intermediate transfer members disclosed herein are VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15, $T_g$=255° C., and $M_w$=8,000), HR-13NX (30 weight percent solution in N-methylpyrrolidone/xylene=67/33, $T_g$=280° C., and $M_w$=10,000), HR-15ET (25 weight percent solution in ethanol/toluene=50/50, $T_g$=260° C., and $M_w$=10,000), HR-16NN (14 weight percent solution in N-methylpyrrolidone, $T_g$=320° C., and $M_w$=100,000), all commercially available from Toyobo Company of Japan, and TORLON® AI-10 ($T_g$=272° C.), commercially available from Solvay Advanced Polymers, LLC, Alpharetta, Ga.

Specific examples of polyetherimide supporting substrates that can be selected for the intermediate transfer members disclosed herein are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic Innovative Plastics.

Optional Release Layers

When desired, an optional release layer can be included in the intermediate transfer member, such as in the configuration of a layer over the disclosed treated carbon black mixture containing layer. The release layer can be included to assist in providing toner cleaning and additional developed image transfer efficiency from a photoconductor to the intermediate transfer member.

When selected, the release layer can have any desired and suitable thickness. For example, the release layer can have a thickness of from about 1 to about 100 microns, from about 10 to about 75 microns, or from about 20 to about 50 microns.

The optional release layer can comprise TEFLON®-like materials including fluorinated ethylene propylene copolymers (FEP), polytetrafluoroethylene (PTFE), polyfluoroalkoxy polytetrafluoroethylene (PFA TEFLON®), and other TEFLON®-like materials; silicone materials, such as fluorosilicones and silicone rubbers, such as Silicone Rubber 552, available from Sampson Coatings, Richmond, Va., polydimethyl siloxane/dibutyl tin diacetate, 0.45 gram DBTDA per 100 grams polydimethyl siloxane rubber mixture, with a molecular weight $M_w$ of approximately 3,500; and fluoroelastomers, such as those available as VITON®, such as copolymers and terpolymers of vinylidenefluoride, hexafluoropropylene, and tetrafluoroethylene, which are known commercially under various designations as VITON® A, E, E60C, E45, E430, B910, GH, B50, and GF. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON® A; (2) a class of terpolymers of vinylidenefluoride, hexafluoropropylene, and tetrafluoroethylene, known commercially as VITON® B; and (3) a class of tetrapolymers of vinylidenefluoride, hexafluoropropylene, tetrafluoroethylene, and a cure site monomer, such as VITON® GF, having 35 mole percent of vinylidenefluoride, 34 mole percent of hexafluoropropylene, and 29 mole percent of tetrafluoroethylene with 2 percent cure site monomer. The cure site monomers can be selected from those available from E.I. DuPont de Nemours, Inc. such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomers.

Intermediate Transfer Member Preparation

The disclosed intermediate transfer member coating dispersions can be prepared by a number of known processes. One method for the preparation of the disclosed coating dispersions involves mechanical stirring and with no ball milling, as illustrated herein, and where the treated carbon black can be initially mixed with a polymer, such as a polyimide, and a solvent of, for example, toluene, hexane, cyclohexane, heptane, tetrahydrofuran, methyl ethyl ketone, methyl isobutyl ketone, N,N'-dimethylformamide, N,N'-dimethylacetamide, N-methylpyrrolidone (NMP), methylene chloride, and mixtures thereof, and where the solvent is selected in, for example, an amount of from about 50 to about 95 weight percent, from about 40 weight percent to about 95 weight percent, from 65 to about 85 weight percent, or from about 50 weight percent to about 75 weight based on the amounts of components in the coating mixture.

Subsequently, a polyamic acid can then be added to the mixture or slurry resulting, and which acid converts to a polyimide upon curing by heating.

The above prepared liquid coating dispersion mixture can then be flow coated on a metal substrate like a stainless steel substrate, aluminum, nickel, copper, and alloys thereof, and glass plates, and subsequently cured by heating to convert the polyamic acid to a polyimide at, for example, from about 50° C. to about 95° C., or from about 50° C. about 75° C. for from about 20 to about 50 minutes, or from about 25 to about 35 minutes, followed by heating at from about 175° C. to about 210° C., or from about 180° C. to about 195° C. for from about 20 to about 45 minutes, or from about 25 to about 35 minutes, and then further heating at from about 290° C. to about 340° C., or from about 300° C. to about 325° C. for from about 40 to about 80 minutes, or for from about 50 to about 65 minutes.

The disclosed intermediate transfer members include, for example, a polyalkylene glycol silicone phosphate treated carbon black present in an amount of from about 5 to about 30 weight percent of total solids or present in an amount of from about 10 to about 20 weight percent of total solids.

The resulting polyimide intermediate transfer member film with a flat configuration, and with no curl, after drying and cooling to room temperature of from about 22° C. to about 25° C. is readily releasable, without the assistance of any external processes, from the metal substrate. That is, the intermediate transfer member films obtained immediately release, or self-release, such as for example, within from about 1 to about 15 seconds, from about 1 to about 10 seconds, from about 5 to about 15 seconds, from about 5 to about 10 seconds, or about 1 second without any external assistance, from the metal substrate, such as a stainless steel substrate. Also, the efficiently and economically formed intermediate transfer member film will fully separate, such as for example, a separation of from about 90 to about 100 percent, or from about 95 to about 99 percent from metal substrates, and where release materials and separate release layers can be avoided.

The self-released disclosed intermediate transfer member film coating dispersion mixture can be selected as an intermediate transfer member or the film resulting can be coated on the optional supporting substrates illustrated herein by liquid spray coating, dip coating, wire wound rod coating, fluidized bed coating, powder coating, electrostatic spraying, sonic spraying, blade coating, molding, laminating, and the like. The optional supporting substrate can be formed in various shapes, such as a belt, or a film using suitable materials that are non-conductive or conductive with the thickness of the intermediate transfer member being, for example, from about 30 to about 1,000 microns, from about 100 to about 800 microns, from about 150 to about 500 microns, from about 100 to about 125 microns, or from about 75 to about 80 microns. In embodiments, the intermediate transfer film coating mixture subsequent to curing can have a thickness of, for example, from about 30 to about 400 microns, from about 15 to about 150 microns, from about 20 to about 100 microns, from about 50 to about 200 microns, from about 70 to about 150 microns, or from about 25 to about 75 microns.

Specific embodiments will now be described in detail. These examples are intended to be illustrative, and not limited to the materials, conditions, or process parameters set forth in these embodiments. All parts are percentages by solid weight unless otherwise indicated. The Young's Modulus was measured following the known ASTM D882-97 process. Samples (0.5 inch×12 inch) of each intermediate transfer member were placed in a commercially available Instron Tensile Tester measurement apparatus, and then the samples were elongated at a constant pull rate until breaking. During this time, there was recorded the resulting load versus the sample elongation. The Young's Modulus value was calculated by taking any point tangential to the initial linear portion of the recorded curve results and dividing the tensile stress by the corresponding strain. The tensile stress was calculated by dividing the load by the average cross sectional area of each of the test samples. The tensile stress at which the sample strip broke was recorded as the break strength.

EXAMPLE I

Ten grams of carbon black (Special Black 4 available from Orion Chemicals) was mixed with 190 grams of tetrahydrofuran (THF) solvent and 1 gram of the polyethylene glycol (PEG) silicone phosphate, SilSense® PE-100 silicone available from Lubrizol Chemical, and which phosphate is represented by the following formula/structure

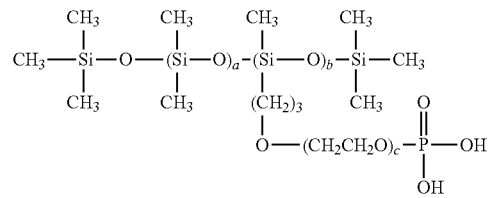

where a is 50, b is 5 and c is 8, and which silicone phosphate can be prepared by the reaction of polyethylene glycol (PEG) dimethicone copolyol and a polyphosphoric acid.

The mixture resulting was milled with 300 grams of 2 millimeters diameter stainless steel shots for 2 hours at 100 rpm, and then the mixture was separated by filtration from the stainless steel shots. Subsequently, the obtained mixture was centrifuged, resulting in a carbon black/polyethylene glycol (PEG) silicone phosphate wet cake. The wet cake was subsequently re-dispersed in 100 grams of the solvent tetrahydrofuran (THF) for 2 hours, and then centrifuged twice more followed by subjecting the resulting wet cake to vacuum drying at 60° C. to obtain the polyethylene glycol (PEG) silicone phosphate (SilSense® PE-100 silicone), ionically bonded to the carbon black, with the presence of a silicone segment on the carbon black, and which ionic bonding and silicone segment presence was confirmed by X-ray photospectroscopy analysis (XPS).

The disclosed PEG silicone phosphate treated carbon black was then readily dispersed in a polymer. Experimentally, 5 grams of the above prepared polyethylene glycol (PEG) silicone phosphate (SilSense® PE-100 silicone) treated carbon black was mixed with a solution of 243.7 grams of a biphenyl tetracarboxylic dianhydride/phenylenediamine (BPDA) polyamic acid/N-methylpyrrolidone (available from Kaneka Chemicals, about 16.6 weight percent solids in N-methylpyrrolidone (NMP) using mechanical stirring (no milling) for 3 hours. The chemical structure of the polyimide, subsequent to the illustrated herein heated curing below of the biphenyl tetracarboxylic dianhydride/phenylenediamine (BPDA) polyamic acid, was as follows

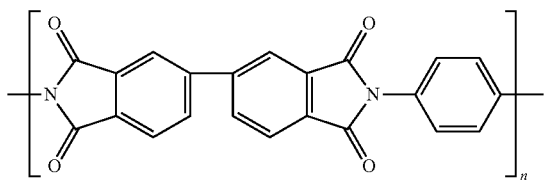

where n is 30.

The resulting PEG silicone phosphate carbon black/polyamic acid with a weight ratio of 11/89 in NMP dispersion was readily filtered through a 20 micron Nylon cloth filter. The carbon black particle size diameter of the dispersion was measured to be about $10^6$ nanometers with a very narrow size distribution with both the size and the distribution being determined by a MALVERN HPPS5001 dynamic light scattering instrument.

The above process was repeated except that there was selected in place of the treated carbon black the untreated carbon black with no polyethylene glycol (PEG) silicone phosphate (SilSense® PE-100 silicone) being present, and the majority, about 90 to 95 percent, of the resulting dispersion did not pass through the micron Nylon cloth filter.

The above prepared disclosed PEG silicone phosphate carbon black/polyamic acid dispersion was then coated on a stainless steel sheet, and cured at 135° C. for 30 minutes, 190° C. for 30 minutes, and 290° C. for 60 minutes where the polyamic acid converted to the polyimide of the formula/structure depicted above wherein n is equal to 30. The resulting PEG silicone phosphate carbon black/polyimide film showed a very smooth and shiny surface. The mechanical properties of the film were measured resulting in a Young's modulus of about 7,500 MPa and a break strength of about 200 MPa, which are very comparable to those of the polyimide film itself.

EXAMPLE II

The processes of Example I were repeated with the exception that in place of the polyethylene glycol silicone phosphate (SilSense® PE-100 silicone), there was selected a polyethylene glycol-co-polypropylene glycol (PEG-co-PPG) silicone phosphate, available from Siltech Corporation, of the following formula/structure

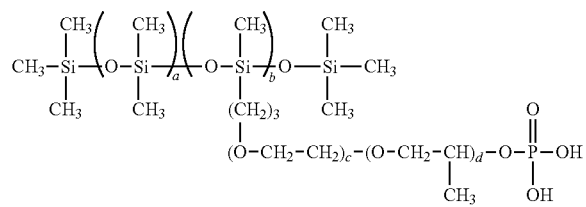

and which silicone can be prepared by the reaction of polyethylene glycol-co-polypropylene glycol (PEG-co-PPG) dimethicone copolyol with polyphosphoric acid, wherein a is 40, b is 4, c is 6, and d is 6.

The resulting PEG-co-PPG silicone phosphate carbon black/polyamic acid with a weight ratio of 11/89 in NMP dispersion was readily filtered through a 20 micron Nylon cloth filter. The carbon black particle size of the dispersion was measured to be about $10^7$ nanometers with a very narrow size distribution, with both the size and the distribution being measured with the MALVERN HPPS5001 dynamic light scattering instrument.

The mechanical properties of the above prepared film were measured resulting in a Young's modulus of about 9,900 MPa and a break strength of about 230 MPa, which are very comparable to those of the polyimide film itself.

Also, when the above process was repeated in accordance with Example I, except that there was selected in place of the silicone polyethylene glycol-co-polypropylene glycol silicone treated carbon black, an untreated carbon black with no polyethylene glycol-co-polypropylene glycol silicone phosphate present, a majority, about 90 to 95 percent of the resulting dispersion did not pass through the micron Nylon cloth filter.

EXAMPLE III

In the absence of milling and by mechanical mixing, there was prepared a coating dispersion containing a polyamic acid of biphenyl tetracarboxylic dianhydride/phenylenediamine, which polyamic acid converts, after curing with heating, into the polyimide of biphenyl tetracarboxylic dianhydride/phenylenediamine of the following formula/structure

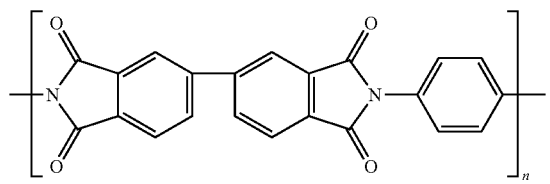

wherein n is about 30.

More specifically, there was prepared by mixing with mechanical stirring to form a slurry the polyethylene glycol silicone phosphate, SilSense® PE-100 silicone treated carbon black of Example I contained in the solvent NMP, about 16.6 weight percent solids, and adding thereto the polyamic acid of biphenyl tetracarboxylic dianhydride/phenylenediamine, followed by a second mechanical stirring for 18 hours, and which dispersion was filtered with a 20 micron Nylon cloth filter. The obtained polyimide/PEG silicone phosphate treated carbon black had a weight ratio of 90/10.

The above prepared final liquid coating dispersion was flow coated on a stainless steel substrate, and subsequently cured to convert the polyamic acid to the polyimide, at 75° C. for 30 minutes, 190° C. for 30 minutes, and then 320° C. for 60 minutes followed by drying to room temperature, about 25° C. The resulting intermediate transfer member film comprised of the above polyimide/polyethylene glycol (PEG) silicone phosphate, SilSense® PE-100 silicone treated carbon black had a thickness of 50 microns, with a flat configuration, and with no curl, and self-released without the assistance of any external processes, in about 5 seconds, from the stainless steel substrate. Accomplishing self-release within a range of from about 1 to about 10 seconds is highly desirable.

EXAMPLE IV

An intermediate transfer member was prepared by repeating the process of Example III with the exception that the polyethylene glycol (PEG) silicone phosphate (SilSense® PE-100 silicone) was replaced with polyethylene glycol-co-polypropylene glycol (PEG-co-PPG) silicone phosphate and substantially similar results were achieved.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A composition comprised of carbon black with at least one ionically bonded polyalkylene glycol silicone phosphate and optionally a polymer.

2. A composition in accordance with claim 1 wherein said alkylene contains from 1 to about 18 carbon atoms.

3. A composition in accordance with claim 1 wherein said alkylene contains from 1 to about 10 carbon atoms.

4. A composition in accordance with claim 1 wherein said alkylene contains from 2 to about 6 carbon atoms.

5. A composition in accordance with claim 1 wherein that said polyalkylene glycol silicone phosphate is ionically bonded to said carbon black as determined by X-ray photospectroscopy analysis, and wherein at least one is from one to about 50.

6. A composition in accordance with claim 1 wherein said polyalkylene glycol silicone phosphate is a polyethylene glycol silicone phosphate as represented by the following formulas/structures

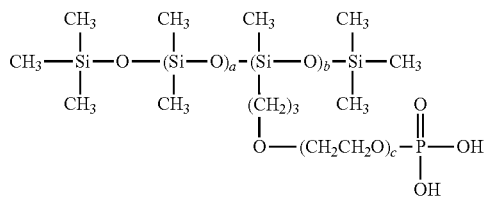

wherein a is from about 4 to about 200, b is from about 1 to about 30, and c is from about 1 to about 40.

7. A composition in accordance with claim 6 wherein a is from about 6 to about 100, b is from about 2 to about 10, and c is from about 2 to about 20.

8. A composition in accordance with claim 1 wherein said polyalkylene glycol silicone phosphate is a polyethylene glycol-co-polypropylene glycol silicone phosphate represented by the following formulas/structures

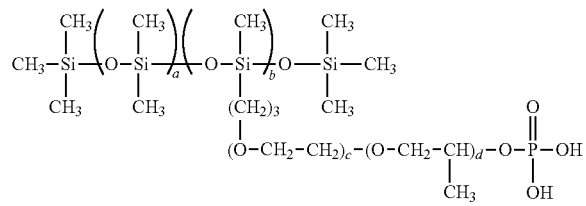

wherein a is from about 4 to about 200, b is from about 1 to about 30, c is from about 1 to about 40, and d is from about 1 to about 40.

9. A composition in accordance with claim 8 wherein a is from about 6 to about 100, b is about 2 to about 10, c is from about 2 to about 20, and d is from about 2 to about 20.

10. A composition in accordance with claim 1 wherein said polyalkylene glycol silicone phosphate possesses an acid value of from about 10 to about 100 mg KOH/g.

11. A composition in accordance with claim 1 wherein said polymer is present, and wherein said ionically bonded polyalkylene glycol silicone phosphate treated carbon black is dispersed in said polymer.

12. A composition in accordance with claim 11 wherein said polymer is selected from the group consisting of a polyimide, a polyester, a polycarbonate, a polyphenylsulfone, a polysulfone, a polyethersulfone, a polyamide, a polyamide-imide, a polyetherimide, a polyolefin, a polystyrene, a polyvinyl halide, a polyvinylidene halide, a polyphenyl sulfide, a polyphenyl oxide, a polyaryl ether, and a polyether ether ketone.

13. A composition in accordance with claim 11 wherein said polymer is a polyimide as represented by the following formulas/structures

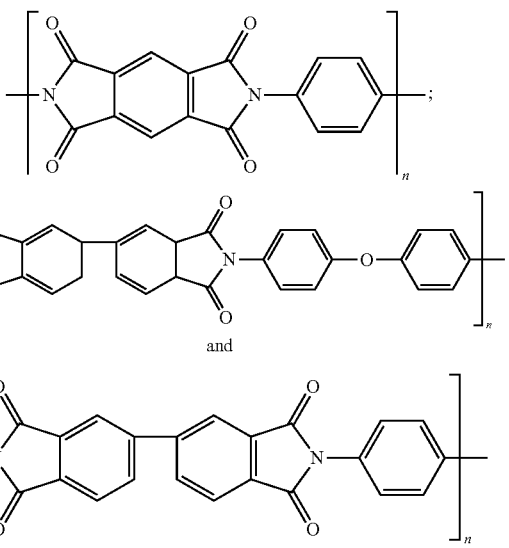

wherein n represents the number of repeating segments of from about 20 to about 200.

14. A composition in accordance with claim 11 wherein said polymer is a polyimide as represented by the following formula/structure

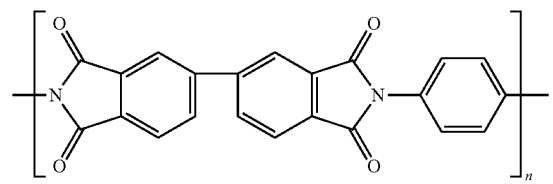

wherein n is 30.

15. A composition in accordance with claim 1 wherein said ionically bonded polyalkylene glycol silicone phosphate treated carbon black composition further comprises a polysiloxane polymer selected from the group consisting of a polyester modified polydimethylsiloxane, a polyether modified polydimethylsiloxane, a polyacrylate modified polydimethylsiloxane, and a polyester polyether modified polydimethylsiloxane.

16. A ball milling free and roll milling free process comprising the mechanical mixing in a solvent of a mixture of ingredients comprising a polymer, or a component that converts to a polymer and an ionically bonded polyalkylene glycol silicone phosphate treated carbon black.

17. A process in accordance with claim 16 wherein said mechanical mixing is accomplished by a magnetic stirrer, a vibrating stirrer, hand stirring with an elongated rod, shaking the mixture, repeatedly transferring the mixture from one container to another container, automatic controlled stirring using at least one paddle, or hand stirring using at least one paddle.

18. A process in accordance with claim 16 wherein said component that converts to a polymer by curing is a polyamic acid, and said mechanical mixing comprises a first mixing with stirring at a stirring speed of from about 75 to about 175 revolutions per minute for a period of from about 2 to about 8 hours thereby forming a slurry, followed by a second mixing with stirring at a stirring speed of from about 50 to about 200 revolutions per minute for a period of from about 6 to about 20 hours, and subsequently filtering the resulting dispersion with a filter with an optional pore size of from about 20 to about 100 microns.

19. A process in accordance with claim 16 wherein said solvent is selected from the group consisting of toluene, hexane, cyclohexane, heptane, tetrahydrofuran, methyl ethyl ketone, methyl isobutyl ketone, N,N'-dimethylformamide, N,N'-dimethylacetamide, N-methylpyrrolidone (NMP), methylene chloride, and mixtures thereof.

20. A process in accordance with claim 16 wherein said polyalkylene glycol silicone phosphate is represented by the following formula/structure

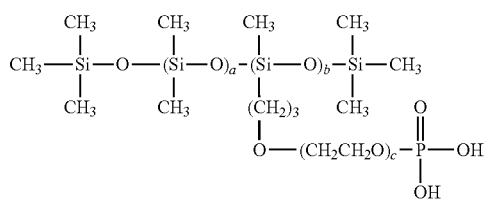

wherein a is from about 4 to about 200, b is from about 1 to about 30, and c is from about 1 to about 40.

21. A process in accordance with claim 16 wherein said polyalkylene glycol silicone phosphate is represented by the following formula/structure

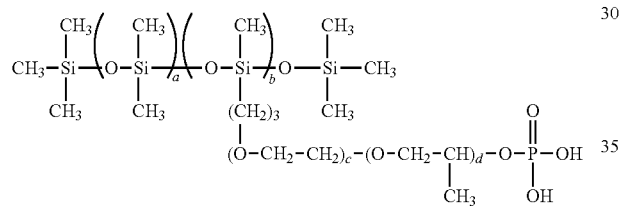

wherein a is from about 4 to about 200, b is from about 1 to about 30, c is from about 1 to about 40, and d is from about 1 to about 40.

22. An intermediate transfer member that accepts a xerographic developed toner image from a photoconductor and which member is comprised of a layer of an ionically bonded polyalkylene glycol silicone phosphate treated carbon black and a polymer.

23. An intermediate transfer member in accordance with claim 22 wherein said ionically bonded polyalkylene glycol silicone phosphate treated carbon black is dispersed in said polymer of a polyimide, and said polyalkylene glycol silicone phosphate is a polyethylene glycol silicone phosphate as represented by the following formula/structure

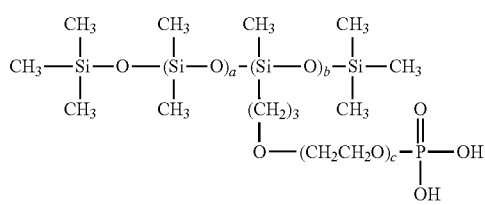

wherein a is from about 4 to about 200, b is from about 1 to about 3, and c is from about 1 to about 40.

24. An intermediate transfer member in accordance with claim 22 wherein said ionically bonded polyalkylene glycol silicone phosphate treated carbon black is dispersed in said polymer of a polyimide, and said polyalkylene glycol silicone phosphate is a silicone polyethylene glycol-co-polypropylene glycol silicone as represented by the following formula/structure

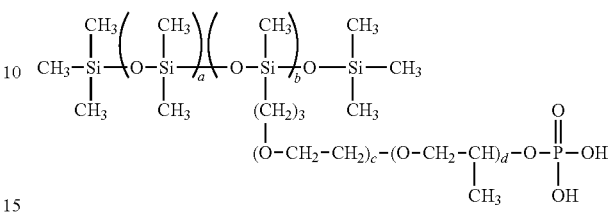

wherein a is from about 4 to about 200, b is from about 1 to about 30, c is from about 1 to about 40, and d is from about 1 to about 40.

25. An intermediate transfer member in accordance with claim 22 wherein said polyalkylene glycol silicone phosphate treated carbon black is present in an amount of from about 5 to about 30 weight percent of total solids, or is present in an amount of from about 10 to about 20 weight percent of total solids.

26. An intermediate transfer member in accordance with claim 22 wherein said polymer is a polyimide as represented by at least one of the following formulas/structures

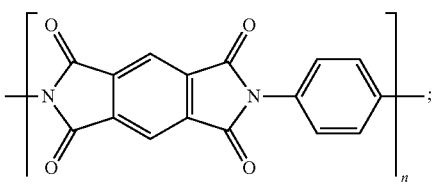

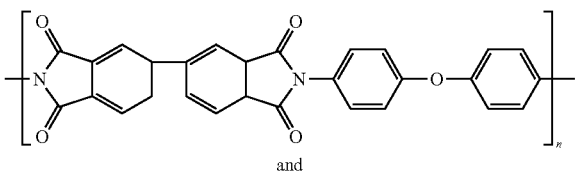

and

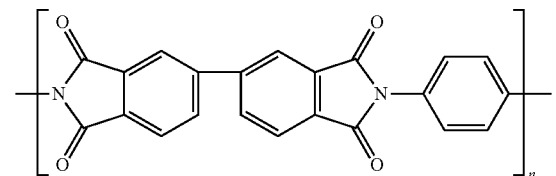

wherein n represents the number of repeating segments of from about 20 to about 200, and optionally further comprising a polysiloxane polymer selected from the group consisting of a polyester modified polydimethylsiloxane, a polyether modified polydimethylsiloxane, a polyacrylate modified polydimethylsiloxane, and a polyester polyether modified polydimethylsiloxane, and optionally further including a release layer comprising at least one component selected from the group consisting of a fluorinated ethylene propylene copolymer, a polytetrafluoroethylene, a polyfluoroalkoxy polytetrafluoroethylene, a fluorosilicone, a terpolymer of vinylidene fluoride, hexafluoropropylene, and tetrafluoroethylene, and mixtures thereof; and wherein said polysiloxane is a copolymer of a polyether and a polydimethylsiloxane, a copolymer of a polyester and a polydimethylsiloxane, a copolymer of a polyacrylate and a polydimethylsiloxane, or a copolymer of a polyester polyether, and a polydimethylsiloxane.

27. An intermediate transfer member in accordance with claim 22 with a Young's modulus of from about 4,000 to about 10,000 MPa, and wherein said member self-releases from a supporting substrate of a metal subsequent to being deposited on said metal, and optionally which self-release is accomplished in from about 1 to about 10 seconds.

28. An intermediate transfer member in accordance with claim 22 with a Young's modulus of about 7,500 MPa and a break strength of about 200 MPa, or with a Young's modulus of about 9,900 MPa and a break strength of about 230 MPa.

* * * * *